(12) United States Patent
Kurokawa (10) Patent No.: US 10,778,131 B2
(45) Date of Patent: Sep. 15, 2020

(54) CONTROL DEVICE OF POWER CONVERSION DEVICE

(71) Applicant: DENSO CORPORATION, Kariya, Aichi-pref. (JP)

(72) Inventor: Sho Kurokawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 16/212,834

(22) Filed: Dec. 7, 2018

(65) Prior Publication Data

US 2019/0190423 A1 Jun. 20, 2019

(30) Foreign Application Priority Data

Dec. 20, 2017 (JP) .................. 2017-243816

(51) Int. Cl.
| | |
|---|---|
| *B62D 5/04* | (2006.01) |
| *H02P 21/20* | (2016.01) |
| *H02P 21/14* | (2016.01) |
| *H02P 21/22* | (2016.01) |
| *H02P 21/18* | (2016.01) |
| *H02P 27/08* | (2006.01) |

(52) U.S. Cl.
CPC .............. *H02P 21/20* (2016.02); *H02P 21/14* (2013.01); *H02P 21/18* (2016.02); *H02P 21/22* (2016.02); *H02P 27/08* (2013.01)

(58) Field of Classification Search
CPC .......... H02P 21/14; H02P 21/18; H02P 21/20; H02P 21/22; H02P 27/08; H02P 29/024
See application file for complete search history.

(56) References Cited

U.S. PATENT DOCUMENTS

| | | | | |
|---|---|---|---|---|
| 5,689,170 A | * | 11/1997 | Ishikawa | B60L 3/0023 318/799 |
| 2002/0190675 A1 | * | 12/2002 | Boscolo | H02P 6/14 318/400.01 |
| 2007/0248338 A1 | | 10/2007 | Kaneko et al. | |
| 2008/0035411 A1 | * | 2/2008 | Yamashita | B62D 5/046 180/443 |
| 2009/0240389 A1 | * | 9/2009 | Nomura | B62D 5/046 701/31.4 |
| 2015/0066305 A1 | * | 3/2015 | Kodera | B62D 5/0472 701/43 |
| 2015/0123577 A1 | * | 5/2015 | Omata | B60L 3/0061 318/400.02 |

FOREIGN PATENT DOCUMENTS

JP 2014-017932 A 1/2014

* cited by examiner

*Primary Examiner* — Muhammad S Islam
(74) *Attorney, Agent, or Firm* — Posz Law Group, PLC (57) ABSTRACT

A control device of a power conversion device for driving a motor includes a current detector and an angle detector. The control devices also includes a motor controller that acquires an electric current and an angle from the respective detectors in a first cycle and drives the motor via the power conversion device, and a toque monitor that acquires the electric current and the angle from the respective detectors in a second cycle and estimates an output torque for determining abnormalities in the motor control. The control device prioritizes acquisition requests for the current and angle from the motor controller and the torque monitor. The torque monitor acquires the current and angle at least twice in the second cycle to acquire a current and angle that are detected at the same time by the detectors.

12 Claims, 5 Drawing Sheets

CONTROL DEVICE OF POWER CONVERSION DEVICE

CROSS REFERENCE TO RELATED APPLICATION

The present application is based on and claims the benefit of priority of Japanese Patent Application No. 2017-243816, filed on Dec. 20, 2017, the disclosure of which is incorporated herein by reference.

TECHNICAL FIELD

The present disclosure generally relates to a control device that drives a motor with a torque instruction via a power conversion device that converts externally supplied electric power to electric power for driving the motor.

BACKGROUND INFORMATION

In vehicles that use an electric drive/traction motor as a propulsion source, such as electric vehicles and hybrid vehicles, the motor is driven so that the output torque of the motor matches a torque instruction from a vehicle control device. The torque instruction from the vehicle control device may be an instructed torque value to be output by the motor.

The power conversion device for driving a motor in such a vehicle is generally accompanied by a control device, which generates a control signal for driving the motor with the instructed torque based on an electric current flowing in the motor and a rotation angle representing a rotation position of a rotor in the motor.

The control device uses two systems, a control system for driving the motor via the power conversion device, and a monitoring system for monitoring the output torque of the motor and performing abnormality determination, where the control and monitoring systems are provided as two separate microcomputers.

The control system and the monitoring system provided as separate microcomputers may complicate the configuration of the control device and increase the manufacturing costs.

However, when both of the control system and the monitoring system in the control device described above are implemented by one microcomputer, hardware resources such as the current detection unit and the angle detection unit in one microcomputer are shared, e.g., used in a time-sharing manner, by the control system and the monitoring system, for the detection and acquisition of the current and the angle.

The hardware resources used in a sharing manner by the control system and the monitoring system for the acquiring the current and the angle may cause a "collision," where the acquisition request for the current from the control system and the acquisition request for the angle from the monitoring system occur almost simultaneously and collide. Collisions may affect the synchronism between the current acquisition and the angle acquisition, where the current and the angle are detected at different detection times.

Accordingly, control devices of power conversion devices of motors are subject to improvement.

SUMMARY

It is an object of the present disclosure to provide a control device that drives a motor with an instructed torque via a power conversion device that limits the loss of synchronism between the detection times for the current flowing in the motor and the motor angle, even when hardware resources for detecting an electric current and detecting an angle are shared by a control system and a monitoring system of the control device. The present disclosure limits the deterioration of detection accuracy of the current and the angle in the control device to limit the loss of motor control accuracy and monitoring accuracy.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described in the following paragraphs with reference to the drawings.

Figure 1:
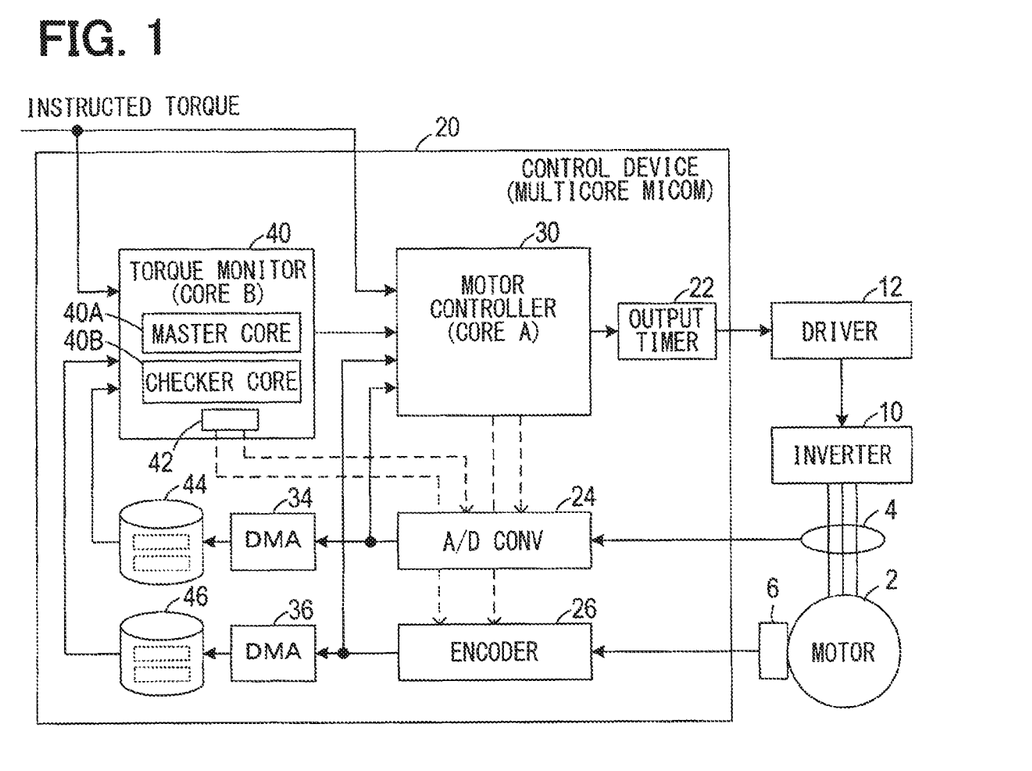
FIG. 1 is a block diagram showing a configuration of a control device in an embodiment of the present disclosure.

As shown in FIG. 1, a control device 20 of the present embodiment controls a motor 2. The motor 2 may be an electric traction motor in a vehicle (not shown) such as an electric vehicle or hybrid vehicle for propelling the vehicle based on an instructed torque (i.e., torque instruction) from a vehicle control device, such as the control device 20. The vehicle control device may control the travel/drive of the vehicle.

The motor 2 may be, for example, a three-phase alternating current (AC) motor that operates in conjunction with an inverter 10 that supplies an alternating electric power from a battery in the vehicle to each of the three phases of the motor 2. That is, the inverter 10 is a power conversion device for driving the motor 2.

A current sensor 4 may be connected to the motor 2 for detecting a motor current flowing from the inverter 10 to the windings of each phase (e.g., the u-phase, v-phase, and w-phase). A resolver 6 may be connected to the motor 2 for generating a signal that changes varies) based on the rotation of the motor 2.

The control device 20 includes an analog-to-digital (A/D) converter 24 for acquiring a current I for each phase of the motor 2 by the A/D conversion of a detection signal from the current sensor 4. The control device 20 also includes an encoder 26 for converting an analog signal of the resolver 6 to digital angle θ data representing a rotor position in the motor 2.

In the present embodiment, a current detector includes both the current sensor 4 and the A/D converter 24 working together to detect the current I. An angle detector includes both the resolver 6 and the encoder 26 working together to detect the angle θ.

The A/D converter 24 acquires the current I and the encoder 26 acquires the angle θ based on a request from a motor controller 30. The acquisition requests are indicated by a broken-line arrow in FIG. 1. The A/D converter 24 inputs the current I and the encoder 26 inputs the angle θ to the motor controller 30.

The motor controller 30 then performs a motor control process where the motor controller 30 acquires the current I from the A/D converter 24 and the angle θ from the resolver 6 in a preset first cycle. The controller 30 then calculates a control amount for driving the motor 2 with an instructed torque, based on the acquired current I and the acquired angle θ.

The control amount calculated in the motor control process is used for controlling a power supply from the inverter 10 to the motor 2 by switching the switching elements in the inverter 10 on and off based on a pulse width modulation (PWM) signal having a preset duty ratio synchronized with a rotation of the motor 2.

By setting the time corresponding to the duty ratio to an output timer 22, the motor controller 30 causes the output timer 22 to output the PWM signal to a driver 12. In such manner, the motor controller 30 can control the electric power supplied from the inverter 10 to the motor 2 via the driver 12.

Calculations for motor control by a motor controller are described in US Publication No. 2015/0123577 by Omata et al. and assigned to DENSO Corporation of Kariya, Japan, which publication is incorporated herein by this reference. As such, a repeat detailed description of calculations for motor control by the motor controller 30 is omitted.

The control device 20 is a multicore microcomputer having a plurality of cores performing various arithmetic processing and operations, and the function of the motor controller 30 can be realized by an execution of a motor control program by a core "A," which is one of the plurality of cores. That is, the processes performed by the motor controller 30 may be realized by the execution of a program or instruction set stored in memory. The memory may be a substantive, non-transitory storage medium. The function of the motor controller 30 may be realized by one program executed by core A.

A core "B," that is different from the core A, is included as another of the plurality of processor cores in the control device 20. A torque monitor 40 includes the core B. The torque monitor 40 monitors an output torque of the motor 2 that is under a drive control of the motor controller 30, and determines an abnormality when the output torque of the motor 2 diverges from the instructed torque by a threshold amount. The processes performed by the torque monitor 40 may be realized by the execution of a program or instruction set stored in memory. The function of the torque monitor may be realized by another program (e.g., different than the program executed by core A) executed by the core B. The torque monitor 40 may execute processes described in greater detail below and shown in FIGS. 2, 3, and 4.

The core B in the torque monitor 40 includes a master core 40A and a checker core 40B. The core B is configured as a lockstep core that is configured to self-diagnose its operations and calculation results, for example, by taking an exclusive OR of the calculation results of the respective cores 40A and 40B.

That is, in the torque monitor 40, the same monitoring process is performed on the "master" core 40A and the "checker" core 40B, and, when the monitoring results match, the torque monitor 40 determines that the monitoring result is normal, and outputs the monitoring result to the motor controller 30.

When the monitoring results are different, the torque monitor 40 determines that the monitoring result(s) are abnormal, and notifies the motor controller 30 and/or the vehicle control device of the abnormal determination.

The torque monitor 40 estimates the output torque of the motor 2 based on the current I and the angle θ of the motor 2, compares the estimated output torque with the instructed torque, and determines that an abnormality has occurred in the motor control when the difference between the estimated output torque and the instructed torque is equal to or greater than a threshold value.

Since the control device 20 is a multicore microcomputer, the torque monitor 40 and the motor controller 30 are provided together in the control device 20 as cores in a multicore microcomputer. The torque monitor 40 and the motor controller 30 share the A/D converter 24 and the encoder 26.

Thus, the A/D converter 24 for detecting the current I and the encoder 26 for detecting the angle θ are operable in response not only to a request from the motor controller 30, but also to a request from the torque monitor 40 as shown by a broken-line arrow in FIG. 1.

When a request from the motor controller 30 and a request from the torque monitor 40 collide, the A/D converter 24 detects the current I and the encoder 26 detects the angle θ by prioritizing the detection request from the motor controller 30 over the detection request from the torque monitor 40. That is, the A/D converter 24 and the encoder 26 delay their detection operations for the torque monitor to prioritize their detection operations for the motor controller 30.

During one torque monitoring period performed every second cycle, the torque monitor 40 requests the current I from the A/D converter 24 and the angle θ from the encoder 26, twice, at a preset interval T1.

That is, the torque monitor 40 sends two requests to the A/D converter 24 and the encoder 26 at intervals, so that at least one of the two requests does not collide with a request from the motor controller 30.

In such manner, the torque monitor 40 is enabled to use the current I and the angle θ for torque monitoring where the current I and the angle θ are detected at the same time via the A/D converter 24 and the encoder 26, without the request from the torque monitor 40 colliding with the request from the motor controller 30.

In order to generate two acquisition requests to the A/D converter 24 and the encoder 26 at different times during the interval T1, the torque monitor 40 includes a time counter 42 to measure the interval T1.

In accordance with a request from the torque monitor 40, data for the current I is stored in a memory 44 via a direct memory access controller (DMA) 34, and data for the angle θ is stored in a memory 46 via a direct memory access controller (DMA) 36. The data for the current I, also referred to as the current I data or simply as the current I, is derived from the last two detections output from the A/D converter 24. The data for the angle θ, also referred to as the angle θ data or simply as the angle θ, is derived from the last two detections output from the encoder 26.

Then, the torque monitor 40 detects the output torque of the motor 2 by using the current I data stored in the memory 44 and the angle θ data stored in the memory 46. As described above, the current I and the angle θ are detected at the same time respectively by the A/D converter 24 and the encoder 26, the current I data is derived from the last two currents I stored in the memory 44, and the angle θ data is derived from the last two angles θ stored in the memory 46.

The DMAs 34 and 36 are both direct memory access controllers. The DMA 34 stores the current I that is A/D-converted by the A/D converter 24 and based on the last two detections directly to the memory 44. The DMA 36 stores the angle θ detected by the encoder 26 from the last two detections directly to the memory 46.

While the present embodiment describes separate DMAs and memories (e.g., 34 and 44, and 36 and 46) for respectively storing the current I and the angle θ, a single combination of a DMA and memory may be used to store both the current I and the angle θ. That is, detection data for the current I and the angle θ may be stored in the same memory and processed by the same DMA.

As described above, the torque monitoring process is performed by the torque monitor 40 in every second cycle for monitoring the torque of the motor 2.

The second cycle is different than the first cycle. The second cycle is a cycle where the torque monitoring process is performed. The first cycle is a cycle where motor control is performed by the motor controller 30. While the first cycle may change and vary based on the rotation state of the motor 2, the second cycle is a constant cycle.

Figure 2:
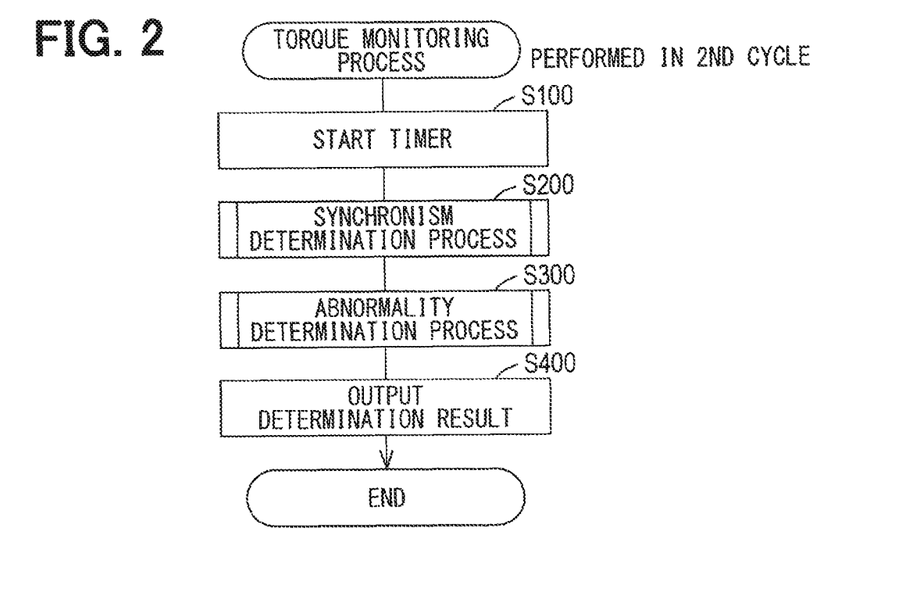
FIG. 2 is a flowchart of a torque monitoring process by a torque monitor.

With reference to FIG. 2, when the torque monitoring process is started by the torque monitor 40, a predetermined count value is set by the time counter 42 at S100, and the time counter 42 starts counting (i.e., measuring time).

Figure 5:
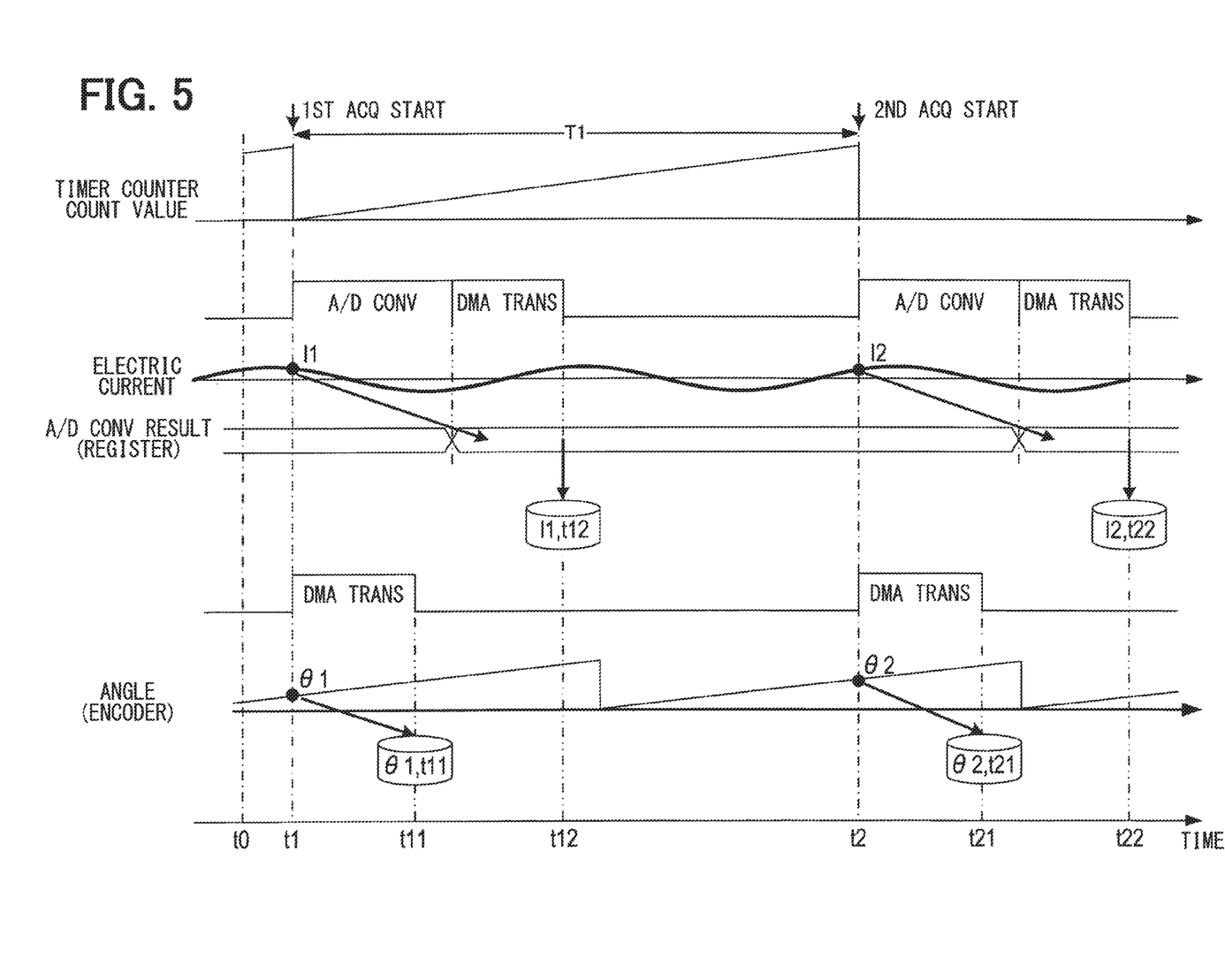
FIG. 5 is a time chart for a current and angle acquiring operation by the torque monitor.

As a result, as shown in FIG. 5, the time counter 42 begins counting a time t0. At time t1, when the count value of the time counter 42 reaches a maximum value, the time counter 42 sends a first acquisition request to the A/D converter 24 and the encoder 26 at time t1.

The time counter 42 resets the count value to zero after the count value reaches the maximum value at time t1, and outputs a second acquisition request to the A/D converter 24 and the encoder 26 at time t2, after the interval T1 lapses, e.g., again when the count value reaches the maximum value.

The time counter 42 stops counting when the count value reaches the maximum value two times after the counter 42 begins counting.

As described above, when the acquisition request for the current I and the angle θ is output by the time counter 42 at time t1 and time t2, the A/D converter 24 converts the current I of each phase of the motor 2 as a current I1 and a current I2 by sequentially performing A/D conversion, and the DMA 34 transfers the A/D conversion results to the memory 44.

In addition, the DMA 36 sequentially transfers the data of the angle θ, which is output from the encoder 26, to the memory 46 as an angle θ1 and an angle θ2.

When transferring and writing the data to the memories 44 and 46, the DMAs 34 and 36 write the transfer time (i.e., time of transferring data) to the memories 44 and 46 as time stamps.

Therefore, at time t12 and time t22, data of the current I1 and the current I2 flowing in each phase of the motor 2 are written to the memory 44 with the time stamps. Time t12 is the time where the current data I1 is written to the memory 44. Relative to time t1 where the current I1 acquisition request is sent, time t12 occurs after an amount of time elapses for the A/D conversion of the current I1 by the A/D converter 24 and an amount of time elapses for the DMA transfer of the current I1 by the DMA 34 to the memory 44. In other words, the duration from time t1 to time t12 is the total time for A/D conversion by the A/D converter 24 and the DMA transfer by the DMA 34. Likewise, t22 is the time where the current data I2 is written to the memory 44, and, relative to t2 where the current I2 acquisition request is sent, occurs after a lapse of time for A/D conversion by the A/D converter 24 and the DMA transfer by the DMA 34.

Similarly, times t11 and t21 are the times when the angles θ1, θ2 indicating the rotor position of the motor 2 are written to the memory 46 together with the time stamps. Relative to time t1, time t11 occurs after an amount of time for the DMA transfer by the DMA 36 has lapsed, and, relative to time t2, time t21 occurs after an amount of time for the DMA transfer by the DMA 36 has lapsed. In other words, the duration of time from time t1 to t11 is the time for transferring the angle θ1 by the DMA 36 to the memory 46 after the angle θ1 acquisition request is received at time t1.

In such manner, after the time counter 42 starts counting at S100, the current I and the angle θ are respectively detected twice, at time t1 and time t2 at the beginning and end of the interval T1. The interval T1 is a constant time that corresponds to an amount of time for the time counter 42 to count to the maximum count value. The detection results are stored in the memories 44 and 46. The memories 44 and 46 may be storage mediums such as RAM to which data can be written and from which data can be retrieved (i.e., read).

Here, the constant time of the interval T1 measured by the time counter 42 is set to be longer than a maximum current acquisition time by the A/D converter 24 and the DMA 34, and longer than a maximum angle acquisition time by the encoder 26 and the DMA 36.

The maximum current acquisition time is the maximum time required for the A/D converter 24 and the DMA 34 to write the current I of each phase of the motor 2 detected by the current sensor 4 to the memory 44.

In cases where A/D conversion for signals other than the current may be required, the A/D conversion is performed sequentially, and the above-described maximum time includes the time required for the A/D conversion of other signals.

The maximum angle acquisition time is the maximum time required for the encoder 26 and the DMA 36 to write the angle θ of the motor 2 to the memory 46 based on the output from the resolver 6.

The constant time interval T1 measured by the time counter 42 is set to be shorter than the first cycle, that is, the control cycle of the motor 2 by the motor controller 30.

On the other hand, the first cycle, which is the control cycle of the motor 2 by the motor controller 30, is set based on the rotation state of the motor 2, which may cause collisions between the current acquisition request and the angle acquisition request if the first cycle is set to be too short. That is, there may be collisions between the request from the motor controller 30 and the requests from the torque monitor 40 for the current I and the angle θ.

Therefore, when variably adjusting the first cycle (i.e., the control cycle of the motor 2) based on the rotation state of the motor 2, the motor controller 30 is configured to set the first cycle to be longer than the maximum current acquisition time and the maximum angle acquisition time.

As a result, at least one of the two acquisition requests from the torque monitor 40 does not collide with the acquisition request from the motor controller 30. When the acquisition requests do not collide, such acquisition requests yield the current I and the angle θ, which are simultaneously detected and respectively written to the memories 44 and 46.

At S200, the torque monitor 40 performs a synchronism determination process for extracting a simultaneous current I from the current I that is stored twice in the memory 44, and extracting a simultaneous angle θ from the angle θ that is stored twice in the memory 46.

The simultaneous current I and the simultaneous angle θ denote a current I and an angle θ that are detected at the same time by the A/D converter 24 and the encoder 26, that is, without delaying the detection time of one of the current I or angle θ in response to the acquisition request from the motor controller 30.

When the simultaneous current I and the angle θ are extracted at S200, the process proceeds to S300, and the torque monitor 40 performs an abnormality determination process where the torque monitor 40 estimates the output torque of the motor 2 on the basis of the extracted current I and angle θ, and compares the estimated torque with the instructed torque.

At S400, the torque monitor 40 performs an output process of the determination result where the torque monitor 40 outputs an abnormality determination result of the abnormality determination process at S300 to the motor controller 30 or another vehicle control device. After the torque monitor 40 outputs the abnormality determination of S300 at S400, the torque monitoring process ends.

When the torque monitor 40 outputs the abnormality determination result at S400 to the motor controller 30, if the motor control by the motor controller 30 is determined to be abnormal, the abnormality determination output by the torque monitor 40 may include a stop instruction for stopping the motor 2. In such manner, the process controls the motor controller 30 to perform a fail-safe process, like stopping the motor 2.

The synchronism determination process performed at S200 and the abnormality determination process performed at S300 are described below in greater detail.

Figure 3:
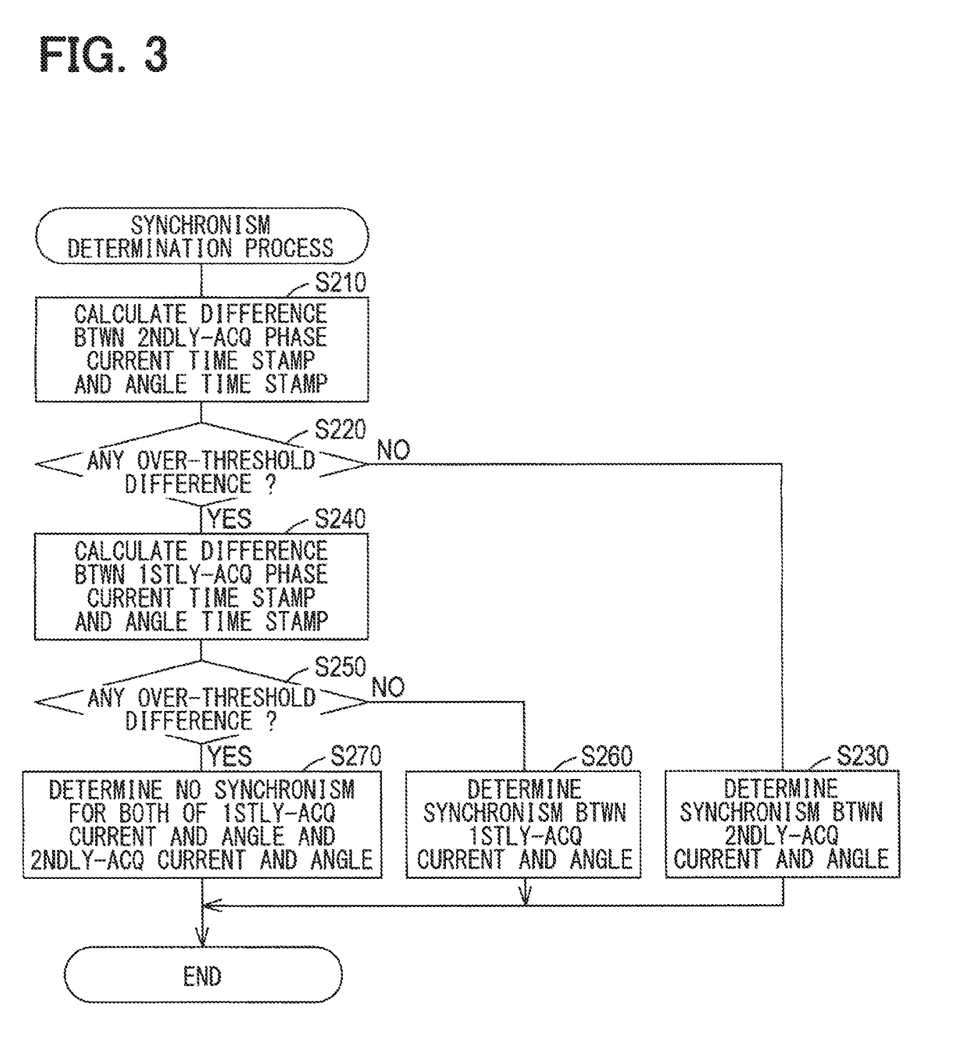
FIG. 3 is a flowchart of a synchronism determination process in FIG. 2.

The synchronism determination process of S200 in FIG. 2 is described in greater detail with reference to FIG. 3. As shown in FIG. 3, at S210 the torque monitor 40 reads the time stamp for the second acquisition of the current I for each phase of the motor 2 (e.g., the time stamp for the current I2 at time t22 in FIG. 5) and the time stamp for the second acquisition of the angle θ (e.g., the time stamp for the angle θ2 at time t21) respectively from the memories 44 and 46, and calculates a time difference between the two time stamps, shown as ("CALCULATE DIFFERENCE BTWN 2NDLY-ACQ PHASE CURRENT TIME STAMP AND ANGLE TIME STAMP") in FIG. 3. Then the process proceeds to S220.

At S220, the torque monitor 40 determines whether the difference is calculated at S210 exceeds a preset threshold.

When the torque monitor 40 determines that the difference between the acquired time stamps of the second acquisition does not exceed the preset threshold, i.e., "NO" at S220, the process proceeds to S230. At S230, the torque monitor 40 determines synchronism between the second acquisition of the current I of each phase of the motor 2 and the second acquisition of angle θ, and the synchronism determination process ends. In other words, at S230, the torque monitor 40 uses the time stamp of the second acquisition of the current I (e.g., the time stamp of I2 at time t22 in FIG. 5) and the time stamp of the second acquisition of the angle θ (e.g., the time stamp of θ2 at time t21) to determine if the current I2 and the angle θ2 were acquired at the same time (e.g., time t2 in FIG. 5).

However, at S220, when the torque monitor 40 determines that the difference exceeds the preset threshold value, i.e., "YES," the process proceeds to S240. At S240, the torque monitor reads the time stamp of the first acquisition of the current I for each phase of the motor 2 (e.g., the time stamp of the current I1 at time t12 in FIG. 5) and the time stamp of the first acquisition of the angle θ (e.g., the time stamp of the angle θ1 at time t11 in FIG. 5) respectively from the memories 44 and 46, and the difference between those time stamps are calculated.

At S250, the torque monitor 40 determines whether the difference calculated at S240 exceeds a preset threshold between the first-acquired time stamps.

When the torque monitor 40 determines that the difference does not exceed the preset threshold value, i.e., "NO" at S250, the process proceeds to S260. At S260, the torque monitor 40 determines synchronism between the first acquisition of the current I of each phase of the motor 2 and the first acquisition of angle θ, and the synchronism determination process ends. In other words, at S260, the torque monitor 40 uses the time stamp of the first acquisition of the current I (e.g., the time stamp of I1 at time t12 in FIG. 5) and the time stamp of the first acquisition of the angle θ (e.g., the time stamp of θ1 at time t11 in FIG. 5) to determine if the current I1 and the angle θ1 were acquired at the same time (e.g., time t1 in FIG. 5). If the torque monitor 40 determines that the current I1 and the angle θ1 are acquired at the same time, this means that the first acquisition of the current I and the first acquisition of the angle θ are determined to have synchronism.

On the contrary, when the torque monitor 40 determines that the difference between the time stamps of the first acquisition current I and the first acquisition angle θ exceed the threshold value at S250, i.e., "YES" at S250, the process proceeds to S270. At S270, the torque monitor 40 determines that neither the first-acquired current I and the first acquired angle θ have synchronism (i.e., the current I and the angle θ were not acquired at the same time), nor do the second-acquired current I and the second acquired angle θ have synchronism. After S270, the synchronism determination process ends.

Figure 4:
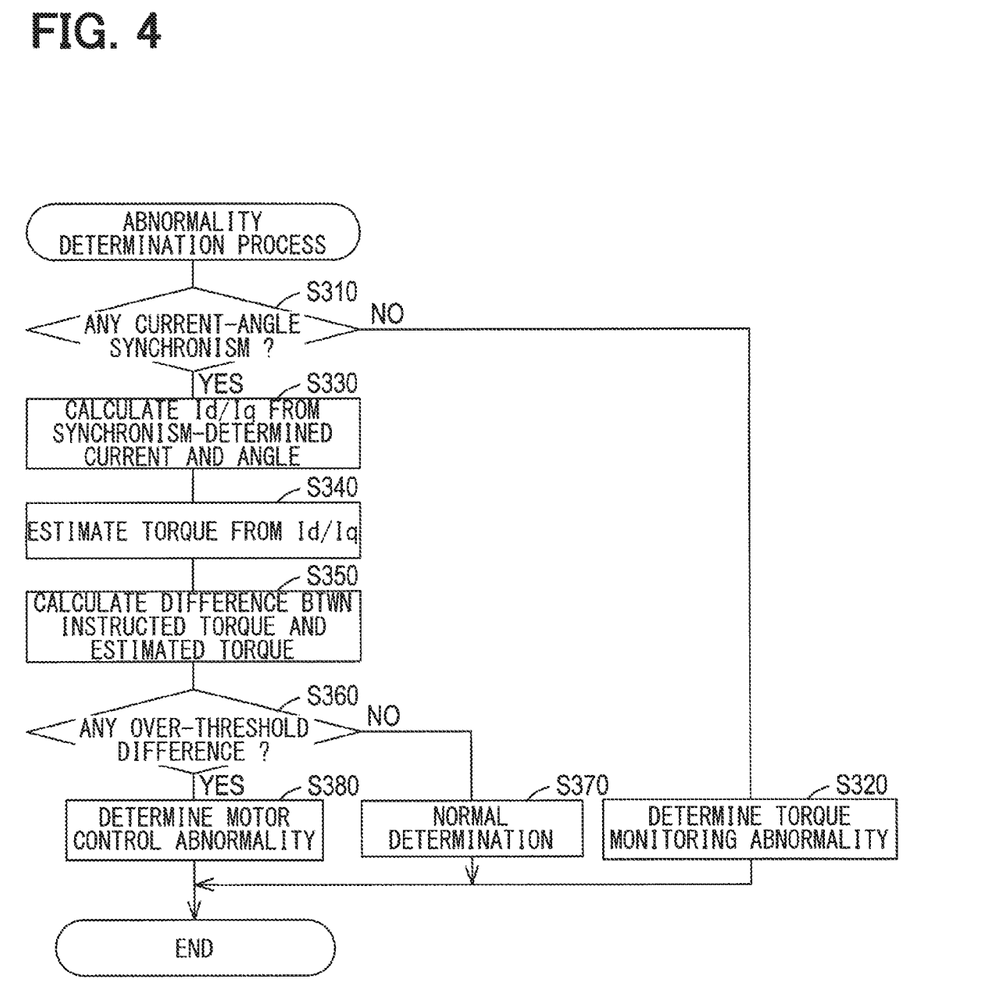
FIG. 4 is a flowchart of an abnormality determination process in FIG. 2.

The abnormality determination process at S300 in FIG. 2 is described in greater detail with reference to FIG. 4. At S310, the torque monitor 40 determines whether the current I and the angle θ have synchronism, based on the results of the synchronism determination process at S200.

When the torque monitor 40 determines that the current I and the angle θ do not have synchronism, i.e., "NO" at S310, the process proceeds to S320. At S320, the torque monitor 40 determines that an abnormality has occurred in the acquisition operation of the current I and the angle θ by the torque monitor 40 (shown as "DETERMINE TORQUE MONITORING ABNORMALITY" at S320 in FIG. 4), and the abnormality determination process then ends.

When the torque monitor 40 determines however, that the current I and the angle θ have synchronism, i.e., "YES" at S310, the process proceeds to S330. The torque monitor 40 estimates the output torque of the motor 2 at S330 and S340.

That is, at S330, the torque monitor 40 acquires the Id current along a d-axis of the motor 2 and an Iq current along a q-axis of the motor 2 based on the current I and the angle θ determined to have synchronism (e.g., determined to have been acquired at the same time). At S340, the torque monitor 40 calculates the estimated output torque of the motor 2 based on the currents Id and Iq acquired at S330.

An output torque calculation procedure for calculating the output torque of a motor is described in US Publication No. 2015/0123577 by Omata et al. and assigned to DENSO Corporation of Kariya, Japan, which publication is incorporated herein by this reference. As such, a repeat detailed description for calculating the output torque of the motor 2 is omitted.

At S350, the torque monitor 40 calculates the difference between the estimated torque calculated at S340 and the instructed torque. The instructed torque is the target torque when the motor controller 30 drives the motor 2. After the calculation at S350, the process proceeds to S360.

At S360, the torque monitor 40 determines whether the difference calculated at S350 exceeds a preset threshold value as a basis for determining whether there are any abnormalities in the motor control by the motor controller 30.

When the torque difference does not exceed the threshold value, i.e., "NO" at S360, the torque monitor 40 determines at S370 that the motor control by the motor controller 30 is being normally performed, that is, without any abnormalities, and the abnormality determination process then ends.

However, when the torque monitor 40 determines that the torque difference exceeds the threshold value, i.e., "YES" at S360, the torque monitor 40 determines at S380 that an abnormality has occurred in the motor control by the motor controller 30, and the abnormality determination process then ends.

The torque monitor 40 outputs the determination results at S320, S370, and S380 to the motor controller 30 and/or another vehicle control device at S400 in FIG. 2.

As described above, the control device 20 of the present embodiment includes the motor controller 30 for driving the motor 2 with the instructed torque via the inverter 10 that serves as a power conversion device, and the torque monitor 40 for monitoring the output torque of the motor 2 that is driven under the control of the motor controller 30.

The control device 20 of the present embodiment has a simple configuration realized by sharing the A/D converter 24 for acquiring the current I of the motor 2 and the encoder 26 for acquiring the angle θ of the motor 2 by two cores, where one core functions as the motor controller 30 and the other core functions as the torque monitor 40.

However, when the A/D converter 24 and the encoder 26 are shared by the motor controller 30 and the torque monitor 40, as described above, the acquisition of the current I and the angle θ by the motor controller 30 and by the torque monitor 40 may be subject to collision, where the acquisition request from the motor controller 30 and the acquisition request from the torque monitor 40 may collide with one another.

In the present embodiment, the A/D converter 24 and the encoder 26 are configured to accept (i.e., receive) the acquisition request from the motor controller 30 in a more prioritized manner than the acquisition request from the torque monitor 40. That is, the acquisition requests from the motor controller 30 have a higher priority for the calculation and output of the current I and the angle θ by the motor controller 30.

Therefore, even if the acquisition requests of the current I and the angle θ collide with each other among the motor controller 30 and the torque monitor 40, the current I and the angle θ are acquired in response to the acquisition request from the motor controller 30, for the output of the current I and the angle θ to the motor controller 30. As such, motor control by the motor controller 30 can be performed properly, that is, normally without any abnormalities in the motor control.

On the other hand, when the acquisition requests from the motor controller 30 and the torque monitor 40 for the current I and the angle θ collide with each other, the detection of the current I and the angle θ detected by the A/D converter 24 and the encoder 26 for the torque monitor 40 is delayed relative to acquisition request by the torque monitor 40.

The amount of time to acquire the current I via the A/D converter 24 and the amount of time to acquire the angle θ via the encoder 26 are different, and the acquisition of the current I has a greater amount of delay than the acquisition of the angle θ, due to the A/D conversion time of the A/D converter 24.

As such, when the acquisition requests collide between the motor controller 30 and the torque monitor 40, for the current I and the angle θ to be input into the torque monitor 40, the detection time of the current I and the detection time of the angle θ can be different from each other, resulting in the loss of synchronism between the current and the angle θ. That is, the collisions cause the current I and the angle θ to be detected at different times.

Figure 6:
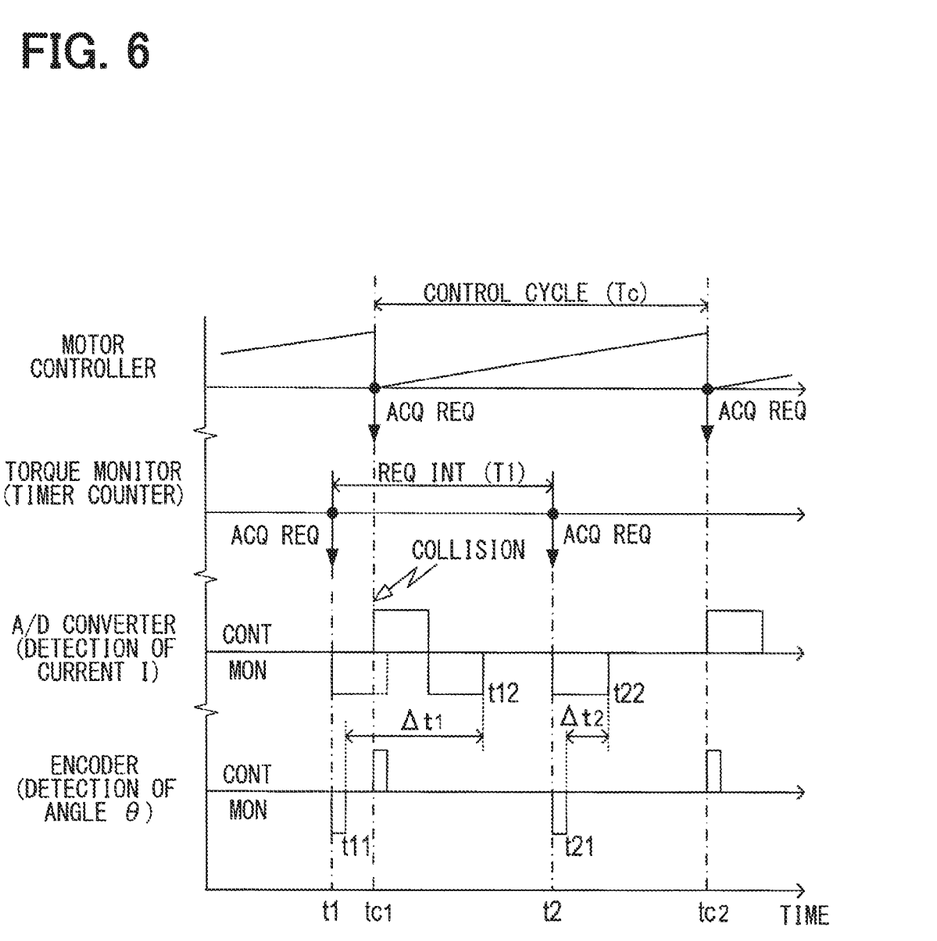
FIG. 6 is a time chart for a current and angle acquiring operation by the torque monitor when acquisition requests collide with a motor controller.

As shown in FIG. 6, an acquisition request collision occurs when an acquisition request comes in from the motor controller 30 in a period between a start of the A/D conversion operation at time t1 and an end of the A/D conversion by the A/D converter 24.

In such a case, the A/D converter 24 interrupts the A/D conversion operation of the current I at time tc1 when the acquisition request from the motor controller 30 occurs, and starts the A/D conversion operation based on the acquisition request from the motor controller 30. Then, after finishing the conversion operation based on the request from the motor controller 30, the A/D converter 24 starts the A/D conversion operation based on the request from the torque monitor 40.

On the other hand, the encoder 26 can promptly output the angle θ of the motor 2 in response to the acquisition request from the torque monitor 40, thereby the torque monitor 40 can detect the angle θ quicker than the detection of the current I.

In such a case, the detection times of the current I and the angle θ to be respectively input to the torque monitor 40 are further shifted from each other by an amount that is greater than the operation time difference between the A/D converter 24 and the encoder 26 (i.e., difference between the operation time of the A/D converter 24 and the operation time of the encoder 26). As such, the synchronism between the current I and the angle θ that are input to the torque monitor 40 is lost.

In the present embodiment, the torque monitor 40 generates an acquisition request twice within the second cycle when the torque monitoring is performed by the torque monitor 40, shown in FIG. 6 at the interval T1. As shown in FIG. 6, T1 is a shorter period than the control cycle Tc of the motor 2 by the motor controller 30.

By generating the two acquisition requests, the torque monitor 40 acquires the currents I and the angles θ detected by the A/D converter 24 and the encoder 26 via the DMAs 34 and 36 and the memories 44 and 46. In such manner, the torque monitor can extract the current I and the angle θ having synchronism (i.e., acquired at the same time from among the currents I and the angles θ respectively acquired twice.

Therefore, the torque monitor 40 can accurately estimate the output torque of the motor 2 based on the current I and angle θ extracted in the above-described manner. The torque monitor 40 can further determine whether there are any abnormalities in the motor control based on the estimated output torque.

As such, with the control device 20 of the present embodiment, by using the A/D converter 24 and the encoder 26 in a shared manner among the motor controller 30 and the torque monitor 40, it is possible not only to simplify the device configuration, but also to perform motor control and torque monitoring with a higher accuracy.

When the control device 20 is realized by a microcomputer having a single core CPU and the CPU is configured to perform the motor control process and the torque monitoring process by an interrupt or like hardware/software timer, the control device 20 may be able to provide the function of the motor controller 30 and the function of the torque monitor 40.

However, in the present embodiment, the control device 20 is a multicore microcomputer having at least two cores, e.g., a core A and a core B, with the core A performing the motor control process, and the core B performing the torque monitoring process.

As such, the function of the motor controller 30 is realized by one program executed by the core A, and the function of the torque monitor 40 is realized by another program executed by the core B. In such manner, the torque monitoring by the torque monitor can be performed as a secure, independent process.

That is, in other words, even when the control core A malfunctions, the monitoring core B can still operate correctly, thereby enabling a detection of motor control abnormality due to the malfunction of the core A, and performing safety measures such as notifying the vehicle occupants of the detected abnormality in the motor control (e.g., via a visual display, warning sound).

In the present embodiment, by implementing the monitoring core B as a lockstep core, the core B is configured to monitor for abnormalities in the core B itself, and to notify the motor controller 30 of any detected abnormalities in the core B.

As such, erroneous determinations by the torque monitor 40 can be prevented and/or limited, and the safety of the control device 20 can be improved.

The torque monitor 40 is provided with a time counter 42 for the acquisition of the current I and the angle θ from the A/D converter 24 and the encoder 26. When the time counter 42 outputs a signal upon having reached the maximum value, the torque monitor 40 is triggered to output the acquisition request.

In such manner, the torque monitor 40 can specify the duration of the interval T1 for acquiring the current I and the angle θ twice from the A/D converter 24 and the encoder 26 based on the count value by the time counter 42 that acts as an interval timer.

That is, in other words, a program executed by the core B for the interruption process to implement the function of the torque monitor 40 does not affect (i.e., change/vary) the duration of the interval T1 during which the current I and the angle θ are twice acquired from the A/D converting section 24 and the encoder 26.

By setting the interval T1 between the two acquisition requests according to the time counter 42 in the above-described manner, the torque monitor 40 can better acquire a current I and an angle θ having synchronism (e.g., detected at the same detection time) at least once from the two acquisition requests.

Although the embodiment of the present disclosure has been described above, the present disclosure should not be limited to the above-described embodiments. For example, various modifications can be made as follows.

For example, in the above-described embodiment, the control device 20 is described as a multicore microcomputer including the core A and the core B, where the core A functions as the motor controller 30 and the core B functions as the torque monitor 40. However, the control device 20 may be a microcomputer having a CPU with a single core.

In such case, the function of the motor controller 30 and the function of the torque monitor 40 may be respectively realized by programs that are executed in parallel by the CPU (i.e., by the single core of the CPU) according to an interrupt or other software/hardware timer.

In the above-described embodiment, the torque monitor 40 is described as sending the acquisition request twice to the A/D converter 24 and the encoder 26 within the second cycle, for periodically monitoring the torque. However, the acquisition request may also be generated and sent three or more times within the second cycle, e.g., three times, four times.

In such manner, the probability the acquisition requests from the torque monitor 40 colliding with the acquisition request from the motor controller 30 can be further reduced. It is also possible to relax the conditions for setting the interval T1 of the acquisition request performed by the torque monitor 40 relative to the conditions in the first cycle where the motor control unit 30 performs the motor control.

In the above embodiment, the time counter 42 determines (e.g., measures) the interval T1 during which the torque monitor 40 generates an acquisition request to the A/D converter 24 and the encoder 26.

However, the interval T1 need not necessarily be measured by the time counter 42, but may also be measured by a software timer that can measure time by using a program executed by the microcomputer.

In the above embodiment, the time stamps of the current I and the angle θ are acquired by the DMAs 34 and 36.

However, the time stamps need not necessarily be acquired by the DMAs 34 and 36. The time stamps may be acquired by the A/D converter 24 and the encoder 26 themselves.

A plurality of functions included in one component in the above embodiments may be realized by a plurality of components, or one function of one component may be realized by a plurality of components.

In addition, a plurality of functions of a plurality of components may be realized by one component, or one function realized by a plurality of components may be realized by one component.

In the above-described embodiments, a portion of the configuration may be omitted, a portion of one embodiment may be replaced with a portion from another embodiment, and the embodiments may be combined with one another to realize the effects and advantages of the above-described embodiments.

Although the present disclosure has been substantially and fully described in connection with the embodiments with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A control device of a power conversion device for driving a motor with an instructed torque, the control device comprising:
   a current detector configured to detect an electric current flowing in the motor;
   an angle detector configured to detect an angle representing a rotor position of the motor;
   a motor controller configured to send a request to acquire the electric current and a request to acquire the angle from the current detector and the angle detector respectively in a first cycle, and to generate a signal for the power conversion device to drive the motor with the instructed torque; and a torque monitor configured to send a request to acquire the electric current and a request to acquire the angle from the current detector and the angle detector respectively in a second cycle, to estimate an output torque of the motor, and to compare the estimated output torque with the instructed torque to determine an abnormality in motor control, wherein when the request to acquire the electric current is received by the current detector from the motor controller while the current detector is handling the request to acquire the electric current from the torque monitor, the current detector interrupts a detection of the electric current and starts handling the request from the motor controller and after finishing the request from the motor controller the current detector starts handling the request from the motor controller; and when the request to acquire the angle is received by the angle detector from the motor controller while the angle detector is handling the request to acquire the angle from the torque monitor, the angle detector interrupts a detection of the angle and starts handling the request from the motor controller and after finishing the request from the motor controller the angle detector starts handling the request from the motor controller, and wherein the torque monitor is further configured to, at each of a first acquisition in the second cycle and a second acquisition in the second cycle which begins at a preset time interval after the first acquisition, send the request to acquire the electric current and the request to acquire the angle, and to estimate the output torque of the motor based on the electric current and the angle, when the electric current and the angle from at least one of the first acquisition and the second acquisition are detected at a same detection time.

2. The control device of claim 1, wherein
the control device is a multicore microcomputer, and wherein
a function of the motor controller is realized by one program executed by one core, and wherein
a function of the torque monitor is realized by another program executed by another core.

3. The control device of claim 2, wherein
the other core of the microcomputer realizing the function of the torque monitor includes a master core and a checker core, the master core and the checker core configured as a lockstep core configured to determine an abnormality of the other core itself.

4. The control device of claim 1, wherein
a time interval for the torque monitor to acquire the electric current and the angle at least twice in the second cycle is longer than a maximum current acquisition time for acquiring the electric current from the current detector and a maximum angle acquisition time for acquiring the angle from the angle detector, and wherein the time interval is shorter than the first cycle.

5. The control device of claim 4, wherein
the motor controller is further configured to further set the first cycle to be longer than the maximum current acquisition time and the maximum angle acquisition time.

6. The control device of claim 1, wherein
the torque monitor includes a time counter configured to measure a time interval for acquiring the electric current and the angle at least twice within the second cycle.

7. A control device of a power conversion device for driving a motor with an instructed torque, the control device comprising:

a current detector configured to detect an electric current flowing in the motor;

an angle detector configured to detect an angle representing a rotor position of the motor;

a motor controller configured to send a request to acquire the electric current and a request to acquire the angle from the current detector and the angle detector respectively in a first cycle, and to generate a signal for the power conversion device to drive the motor with the instructed torque; and a torque monitor configured to send a request to acquire the electric current and a request to acquire the angle from the current detector and the angle detector respectively in a second cycle, to estimate an output torque of the motor, and to compare the estimated output torque with the instructed torque to determine an abnormality in motor control, wherein the current detector and the angle detector are respectively configured to prioritize the request from the motor controller over the request from the torque monitor, and wherein the torque monitor is further configured to, at each of a first acquisition in the second cycle and a second acquisition in the second cycle which begins at a preset time interval after the first acquisition, send the request to acquire the electric current and the request to acquire the angle, and to estimate the output torque of the motor based on the electric current and the angle, when the electric current and the angle from at least one of the first acquisition and the second acquisition are detected at a same detection time.

8. The control device of claim 7, wherein
the control device is a multicore microcomputer, and wherein
a function of the motor controller is realized by one program executed by one core, and wherein
a function of the torque monitor is realized by another program executed by another core.

9. The control device of claim 8, wherein
the other core of the microcomputer realizing the function of the torque monitor includes a master core and a checker core, the master core and the checker core configured as a lockstep core configured to determine an abnormality of the other core itself.

10. The control device of claim 7, wherein
a time interval for the torque monitor to acquire the electric current and the angle at least twice in the second cycle is longer than a maximum current acquisition time for acquiring the electric current from the current detector and a maximum angle acquisition time for acquiring the angle from the angle detector, and wherein the time interval is shorter than the first cycle.

11. The control device of claim 10, wherein
the motor controller is further configured to further set the first cycle to be longer than the maximum current acquisition time and the maximum angle acquisition time.

12. The control device of claim 7, wherein
the torque monitor includes a time counter configured to measure a time interval for acquiring the electric current and the angle at least twice within the second cycle.

* * * * *